United States Patent
Takahashi et al.

(10) Patent No.: US 6,812,660 B2
(45) Date of Patent: Nov. 2, 2004

(54) APPARATUS FOR CONTROLLING BRUSHLESS MOTOR

(75) Inventors: Yutaka Takahashi, Wako (JP); Nobuyuki Imai, Wako (JP)

(73) Assignee: Honda Giken Kogyo Kabushiki Kaisha, Toyko (JP)

( * ) Notice: Subject to any disclaimer, the term of this patent is extended or adjusted under 35 U.S.C. 154(b) by 0 days.

(21) Appl. No.: 10/617,777

(22) Filed: Jul. 14, 2003

(65) Prior Publication Data

US 2004/0012367 A1 Jan. 22, 2004

(30) Foreign Application Priority Data

Jul. 15, 2002 (JP) ........................................ 2002-205691

(51) Int. Cl.$^7$ ............................................... H02P 5/06
(52) U.S. Cl. ........................ 318/254; 308/609; 308/610; 308/632; 308/432
(58) Field of Search ................................ 318/138, 439, 318/254, 432, 609, 610, 632

(56) References Cited

U.S. PATENT DOCUMENTS

| | | | | |
|---|---|---|---|---|
| 5,400,240 A | * | 3/1995 | Araki ............................ | 363/97 |
| 5,565,752 A | * | 10/1996 | Jansen et al. ................. | 318/807 |
| 5,656,911 A | * | 8/1997 | Nakayama et al. ........... | 318/718 |
| 6,018,225 A | * | 1/2000 | Garces ......................... | 318/798 |
| 6,320,349 B1 | * | 11/2001 | Kaneko et al. ............... | 318/798 |
| 6,396,229 B1 | * | 5/2002 | Sakamoto et al. ........... | 318/439 |
| 6,407,531 B1 | * | 6/2002 | Walters et al. ............... | 318/805 |
| 6,608,456 B2 | * | 8/2003 | Imai et al. .................... | 318/254 |
| 6,737,828 B2 | * | 5/2004 | Kiuchi et al. ................ | 318/779 |
| 2002/0149335 A1 | | 10/2002 | Imai et al. | |

FOREIGN PATENT DOCUMENTS

JP   2002-320398   10/2002

* cited by examiner

*Primary Examiner*—Rina Duda
(74) *Attorney, Agent, or Firm*—Arent Fox PLLC

(57) ABSTRACT

An angle detector 25 sets a q-axis command current to a first magnetic pole detecting current Iq_p1 and a second magnetic pole detecting current $Iq_{13}p2$, and performs a magnetic pole detecting process to calculate a first magnetic pole reference value $A_1$ and a second magnetic pole reference value $A_2$ ($t_2$–$t_3$, $t_4$ –$t_5$), and detect the orientation of the magnetic poles of a rotor 2 of a motor 1 based on the sign of the difference $\Delta A$ (=$A_1$–$A_2$) between the first magnetic pole reference value $A_l$ and the second magnetic pole reference value $A_2$. The angle detector 25 effects a proportional process only on the difference between the q-axis command current and a detected q-axis current and the difference between a d-axis command current and a detected d-axis current to calculate a current difference ($t_2$–$t_5$) under current feedback control when the magnetic pole detecting process is carried out, and effects a proportional plus integral process on the above differences to calculate a current difference ($t_0$–$t_2$, $t_5$-) under current feedback control when the magnetic pole detecting process is not carried out.

6 Claims, 6 Drawing Sheets

FIG. 3
| STATUS | SATURATED | UNSATURATED |
|---|---|---|
| MAGNETIC FLUX | 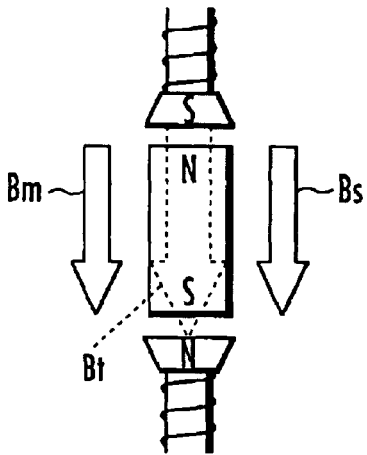 | 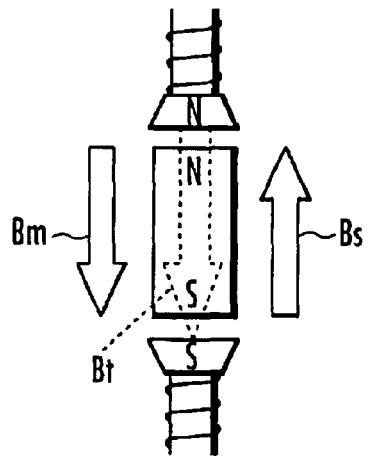 |
| q-AXIS CURRENT | POSITIVE DIRECTION | NEGATIVE DIRECTION |
| MAGNETIC POLE REFERENCE VALUE | INCRREASED | REEUCED |

APPARATUS FOR CONTROLLING BRUSHLESS MOTOR

BACKGROUND OF THE INVENTION

1. Field of the Invention

The present invention relates to an apparatus for controlling a salient-pole DC brushless motor by controlling armature currents of the motor based on a rotor angle thereof which is detected without using a position detection sensor.

2. Description of the Related Art

For energizing a DC brushless motor to produce a desired torque, it is necessary to apply voltages to the armatures in suitable phases corresponding to the electric angle of the rotor (hereinafter referred to as "rotor angle") which has magnetic poles. There have been proposed various processes of detecting a rotor angle without using a position detection sensor in order to reduce the cost of the DC brushless motor and a motor control apparatus therefor by way of dispensing with any position detection sensor for detecting the rotor angle.

The inventors of the present application have proposed a rotor angle detector for detecting a rotor angle of a DC brushless motor without using a position detection sensor in an earlier patent application (Japanese patent laid-open publication No. 2002-320398). The disclosed rotor angle detector operates as follows: When high-frequency voltages are added to drive voltages that are applied to three-phase armatures of a salient-pole DC brushless motor, the rotor angle detector uses a detected value of a current flowing through the first-phase armature, a detected value of a current flowing through the second-phase armature, and high-frequency components depending on the high-frequency voltages to calculate a sine reference value depending on the sine value of a twofold angle which is twice the rotor angle of the DC brushless motor and a cosine reference value depending on the cosine value of the twofold angle. Then, the rotor angle detector calculates the rotor angle of the DC brushless motor using the sine reference value and the cosine reference value which have been calculated. When a rotor angle is detected using the sine reference value and the cosine reference value, the detected rotor angle has a period of 180 degrees. In order to detect a rotor angle in a range of 360 degrees, it is necessary to detect the orientation of the magnetic poles of the rotor at the time the motor starts rotating.

If the time required to detect the orientation of the magnetic poles of the rotor is long, then the motor suffers a delayed start.

SUMMARY OF THE INVENTION

It is therefore an object of the present invention to provide an apparatus for controlling a DC brushless motor to reduce the time required to detect the orientation of the magnetic poles of the rotor of the DC brushless motor.

According to the present invention, there is provided an apparatus for controlling a salient-pole DC brushless motor having armatures in three phases, comprising voltage applying means for applying drive voltages to the armatures, high-frequency adding means for adding high-frequency voltages to the drive voltages, first current detecting means for detecting a current flowing through an armature in a first phase of the armatures in the three phases, second current detecting means for detecting a current flowing through an armature in a second phase of the armatures in the three phases, and reference value extracting means for extracting a sine reference value depending on the sine value of a twofold angle which is twice a rotor angle of the motor and a cosine reference value depending on the cosine value of the twofold angle, using a first current value detected by the first current detecting means and a second current value detected by the second current detecting means when the high-frequency voltages are added to the drive voltages by the high-frequency adding means, and high-frequency components depending on the high-frequency voltages.

The apparatus also has rotor angle calculating means for calculating a rotor angle of the motor using the sine reference value and the cosine reference value, three-phase/dq converting means for handling the motor as an equivalent circuit having a q-axis armature disposed on an q-axis in the direction of magnetic fluxes from a rotor of the motor and a d-axis armature disposed on a d-axis which is perpendicular to the q-axis, and calculating a detected q-axis current flowing through the q-axis armature and a detected d-axis current flowing through the d-axis armature based on the rotor angle of the motor which is calculated by the rotor angle calculating means, the first current value, and the second current value, current control means for determining the drive voltages in order to eliminate a q-axis current difference which is the difference between the detected q-axis current and a predetermined q-axis command current and a d-axis current difference which is the difference between the detected d-axis current and a predetermined d-axis command current, and magnetic pole detecting means for carrying out a magnetic pole detecting process to detect the orientation of the magnetic poles of the rotor based on a magnetic pole reference value calculated by a predetermined calculating process, depending on the sine reference value and the cosine reference value which are extracted by the reference value extracting means when the q-axis command value is set to a predetermined magnetic pole detecting current.

The current control means performs a proportional plus integral process on the difference between the detected q-axis current and the q-axis command current to calculate the q-axis current difference and also performs a proportional plus integral process on the difference between the detected d-axis current and the d-axis command current to calculate the d-axis current difference when the magnetic pole detecting process is not carried out, and performs an integral process only on the difference between the detected q-axis current and the q-axis command current to calculate the q-axis current difference and also performs an integral process only on the difference between the detected d-axis current and the d-axis command current to calculate the d-axis current difference when the magnetic pole detecting process is carried out.

With the above arrangement, when the magnetic pole detecting process is carried out, the current control means performs an integral process only on the difference between the detected q-axis current and the q-axis command current to calculate the q-axis current difference and also performs an integral process only on the difference between the detected d-axis current and the d-axis command current to calculate the d-axis current difference. Therefore, when the q-axis command current is set to the magnetic pole detecting current, the current control means controls the current flowing through the q-axis armature to pass the magnetic pole detecting current through the q-axis armature without causing a delay which would otherwise result from an integral process.

In this case, the time spent after the q-axis command current is set to the magnetic pole detecting current until currents depending on the magnetic pole detecting current are detected by the first current detecting means and the second current detecting means. Therefore, the time required until the sine reference value and the cosine reference value depending on the magnetic pole detecting current and the magnetic pole reference value calculated depending on the magnetic pole detecting current are obtained.

Accordingly, the time required to detect the orientation of the magnetic poles of the rotor of the motor based on the magnetic pole reference value according to the magnetic pole detecting process is shortened.

Also, according to the present invention, there is provided a method for controlling a salient-pole DC brushless motor having armatures in three phases, an apparatus for controlling the DC brushless motor comprising voltage applying means for applying drive voltages to the armatures, high-frequency adding means for adding high-frequency voltages to the drive voltages, first current detecting means for detecting a current flowing through an armature in a first phase of the armatures in the three phases, second current detecting means for detecting a current flowing through an armature in a second phase of the armatures in the three phases, and reference value extracting means for extracting a sine reference value depending on the sine value of a twofold angle which is twice a rotor angle of the motor and a cosine reference value depending on the cosine value of the twofold angle, using a first current value detected by the first current detecting means and a second current value detected by the second current detecting means when the high-frequency voltages are added to the drive voltages by the high-frequency adding means, and high-frequency components depending on the high-frequency voltages, rotor angle calculating means for calculating a rotor angle of the motor using the sine reference value and the cosine reference value, and three-phase/dq converting means for handling the motor as an equivalent circuit having a q-axis armature disposed on a q-axis in the direction of magnetic fluxes from a rotor of the motor and a d-axis armature disposed on a d-axis which is perpendicular to the q-axis, and calculating a detected q-axis current flowing through the q-axis armature and a detected d-axis current flowing through the d-axis armature based on the rotor angle of the motor which is calculated by the rotor angle calculating means, the first current value, and the second current value.

Moreover, the method for controlling the DC brushless motor comprises the step of determining the drive voltages in order to eliminate a q-axis current difference which is the difference between the detected q-axis current and a predetermined q-axis command current and a d-axis current difference which is the difference between the detected d-axis current and a predetermined d-axis command current, performing a magnetic pole determination process for detecting the orientation of the magnetic poles of the rotor based on a magnetic pole reference value calculated by a predetermined calculating process, depending on the sine reference value and the cosine reference value which are extracted by the reference value extracting means when the q-axis command value is set to a predetermined magnetic pole detecting current, and performing a proportional plus integral process on the difference between the detected q-axis current and the q-axis command current to calculate the q-axis current difference and also performing a proportional plus integral process on the difference between the detected d-axis current and the d-axis command current to calculate the d-axis current difference when the magnetic pole detecting process is not performed, and performing an integral process only on the difference between the detected q-axis current and the q-axis command current to calculate the q-axis current difference and also performing an integral process only on the difference between the detected d-axis current and the d-axis command current to calculate the d-axis current difference when the magnetic pole detecting process is performed.

With the above arrangement, the time spent after the q-axis command current is set to the magnetic pole detecting current until currents depending on the magnetic pole detecting current are detected by the first current detecting means and the second current detecting means. Therefore, the time required until the sine reference value and the cosine reference value depending on the magnetic pole detecting current and the magnetic pole reference value calculated depending on the magnetic pole detecting current are obtained.

Accordingly, the time required to detect the orientation of the magnetic poles of the rotor of the motor based on the magnetic pole reference value according to the magnetic pole detecting process is shortened and thus the current flowing in the armature can be controlled.

The apparatus and method for controlling a salient-pole DC brushless motor according to the present invention sets a first magnetic pole detecting current and a second magnetic pole detecting current which is opposite in direction to the first magnetic pole detecting current as the magnetic pole detecting current, and detects the orientation of the magnetic poles of the rotor based on the difference between a first magnetic pole reference value calculated by the predetermined calculating process depending on the sine reference value and the cosine reference value which are extracted by the reference value extracting means when the first magnetic pole detecting current is set, and a second magnetic pole reference value calculated by the predetermined calculating process depending on the sine reference value and the cosine reference value which are extracted by the reference value extracting means when the second magnetic pole detecting current is set. between a first magnetic pole reference value calculated by the predetermined calculating process depending on the sine reference value and the cosine reference value which are extracted by the reference value extracting means when the first magnetic pole detecting current is set, and a second magnetic pole reference value calculated by the predetermined calculating process depending on the sine reference value and the cosine reference value which are extracted by the reference value extracting means when the second magnetic pole detecting current is set.

With the above arrangement, as described in detail later on, the sign of the difference between the first magnetic pole reference value calculated when the first magnetic pole detecting current is set as the magnetic pole detecting current and the second magnetic pole reference value calculated when the second magnetic pole detecting current is set as the magnetic pole detecting current is inverted depending on the orientation of the magnetic poles of the rotor. Therefore, the orientation of the magnetic poles of the rotor can be detected based on the difference between the first magnetic pole reference value and the second magnetic pole reference value.

The reference value extracting means extracts the sine reference value and the cosine reference value respectively according to the following equations (1), (2):

$$Vs = \int_0^{\frac{2\pi}{\omega}} \left\{ \cos 2\omega t \cos\left(\omega t + \frac{2}{3}\pi\right) \cdot Iu - \cos 2\omega t \cos \omega t \cdot Iw \right\} dt \quad (1)$$

-continued $$Vc = -\int_0^{\frac{2\pi}{\omega}} \left\{ \sin 2\omega t \cos\left(\omega t + \frac{2}{3}\pi\right) \cdot Iu - \sin 2\omega t \cos \omega t \cdot Iw \right\} dt \quad (2)$$

where Vs: the sine reference value, Vc: the cosine reference value, Iu: the first current value, Iw: the second current value, and a: the angular velocity of the high-frequency voltages.

With the above arrangement, the reference value extracting means can calculate the sine reference value (Vs) and the cosine reference value (Vc) from the first current value (Iu), the second current value (Iw), and the angular velocity of the high-frequency voltages. The rotor angle calculating means can calculate the rotor angle of the motor using the sine reference value (Vs) and the cosine reference value (Vc). The magnetic pole detecting means can detect the orientation of the magnetic poles of the rotor based on the magnetic pole reference value which is calculated depending on the sine reference value (Vs) and the cosine reference value (Vc).

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 3 and 4 are diagrams illustrative of a process of detecting the magnetic poles of a rotor;

DESCRIPTION OF THE PREFERRED EMBODIMENT

Figure 1:
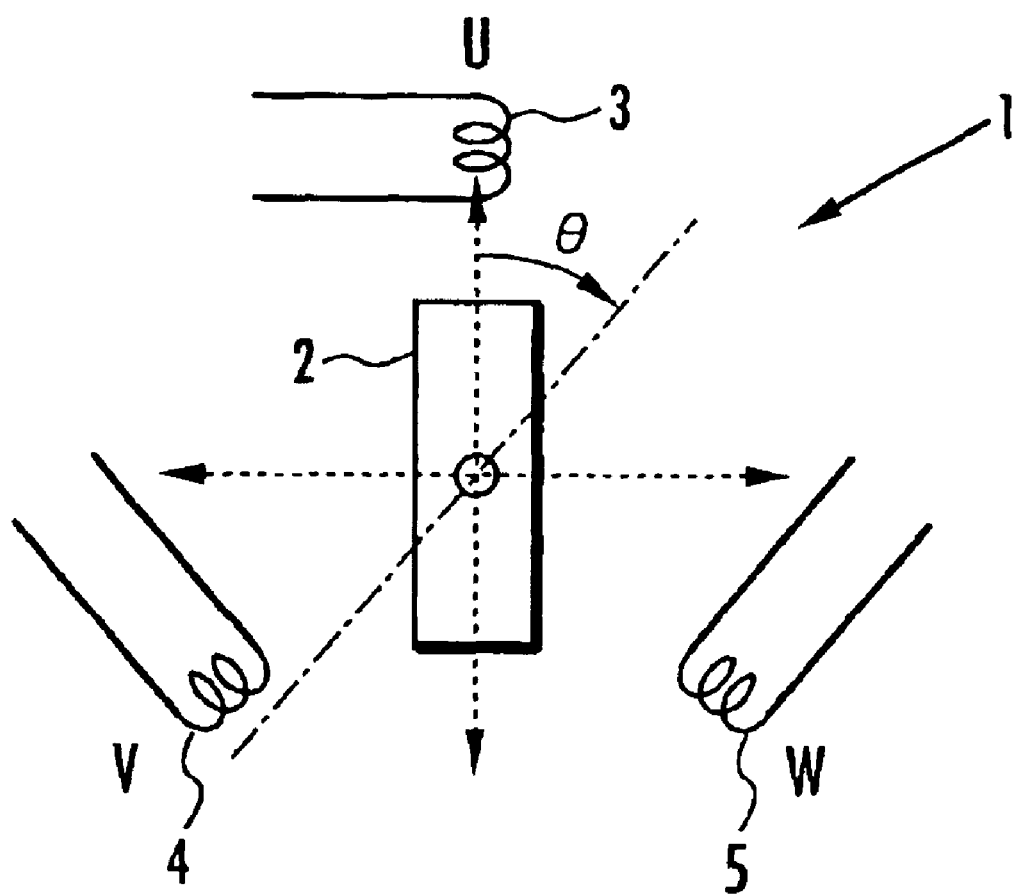
FIG. 1 is a schematic diagram of a DC brushless motor to be controlled by a brushless motor control apparatus according to the present invention.
Figure 2:
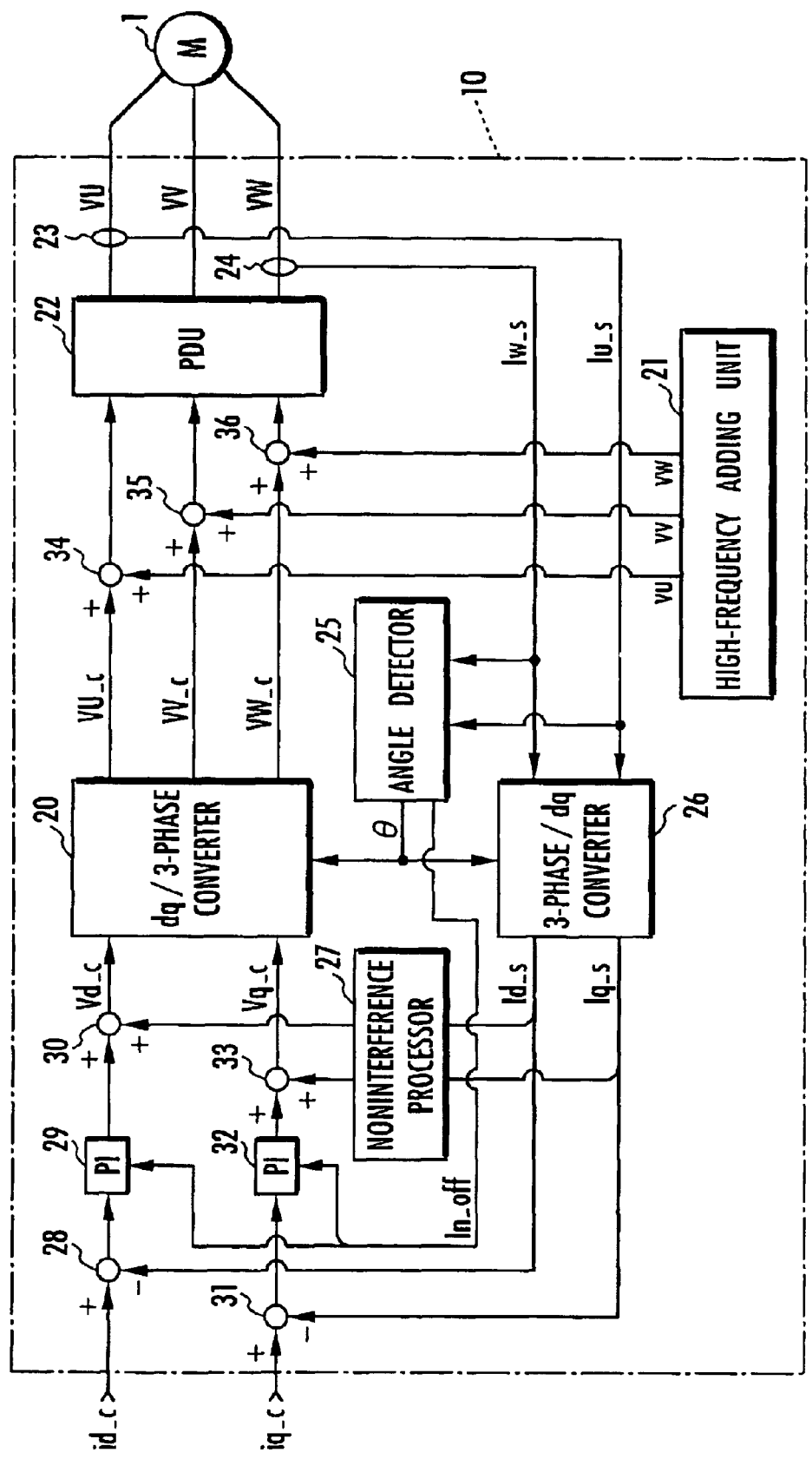
FIG. 2 is a block diagram of a motor controller as the brushless motor control apparatus according to the present invention for controlling the DC brushless motor shown in FIG. 1.

As shown in FIG. 2, a motor controller 10, which serves as an apparatus for controlling a DC brushless motor according to the present invention, controls currents flowing through armatures 3, 4, 5 of a salient-pole DC brushless motor 1 (hereinafter referred to as "motor 1") shown in FIG. 1 according to a feedback control process. The motor controller 10 handles an equivalent circuit that is converted from the motor 1, the equivalent circuit being of a dq coordinate system having a q-axis armature disposed on an q-axis which is the same as the direction of magnetic fluxes from the field magnetic poles of a rotor 2 and a d-axis armature disposed on a d-axis which is perpendicular to the q-axis.

The motor controller 10 controls the voltages applied to the three-phase armatures of the motor 1 so that a d-axis command current Id_c supplied from an external source as a command value for a current flowing through the d-axis armature (hereinafter referred to as "d-axis current") and a q-axis command current Iq_c supplied from the external source as a command value for a current flowing through the q-axis armature (hereinafter referred to as "q-axis current") will be equalized respectively to a detected d-axis current Id_s and a detected q-axis current Iq_s which are calculated from detected values of currents actually flowing through the respective three-phase armatures of the motor 1 by a three-phase/dq conversion process.

The motor controller 10 comprises a dq/3-phase converter 20 for converting a command value Vd_c for a voltage applied to the d-axis armature (hereinafter referred to as "d-axis voltage") and a command value Vq_c for a voltage applied to the q-axis armature (hereinafter referred to as "q-axis voltage") into command values VU_c, VV_c, VW_c for drive voltages applied respectively to the armatures in three phases U, V, W of the motor 1, a high-frequency adding unit 21 (corresponding to a high-frequency adding means according to the present invention) for adding high-frequency voltages vu, vv, vw respectively to the output voltages VU_c, VV_c, VW_c from the dq/3-phase converter 20, and a power drive unit 22 (corresponding to a voltage applying means according to the present invention) for applying drive voltages VU, VV, VW depending on the voltages VU_c, VV_c, VW_c to which the high-frequency voltages vu, vv, vw have been added, respectively to the armatures in the three phases U, V, W of the motor 1.

The motor controller 10 also comprises a U-phase current sensor 23 (corresponding to a first current detecting means according to the present invention) for detecting a current flowing through the armature in the U phase (corresponding to a first phase according to the present invention) of the motor 1, a W-phase current sensor 24 (corresponding to a second current detecting means according to the present invention) for detecting a current flowing through the armature in the W phase (corresponding to a second phase according to the present invention) of the motor 1, an angle detector 25 for detecting a rotor angle θ (see FIG. 1) of the motor 1 using a current value Iu_s detected by the U-phase current sensor 23 and a current value Iw_s detected by the W-phase current sensor 24, a three-phase/dq converter 26 (corresponding to a three-phase/dq converting means according to the present invention) for calculating the detected d-axis current Id_s and the detected q-axis current Iq_s using the current value Iu_s and the current value Iw_s, and a noninterference processor 27 for canceling the effects of velocity electromotive forces that interfere with each other between the d-axis and the q-axis.

The motor controller 10 also has a first subtractor 28, a first PI processor 29, a first adder 30, a second subtractor 31, a second PI processor 32, and a second adder 33.

The first subtractor 28 subtracts the detected d-axis current Id_s from the d-axis command current Id_c. The first PI processor 29 performs a PI (Proportional plus Integral) process on the difference produced by the first subtractor 28. The first adder 30 adds a noninterference component to a d-axis current difference output from the first PI processor 29, thus generating the command value Vd_c for the d-axis voltage depending on the d-axis current difference.

Similarly, the second subtractor 31 subtracts the detected q-axis current Iq_s from the q-axis command current Iq_c. The second PI processor 32 performs a PI process on the difference produced by the second subtractor 31. The second adder 33 adds a noninterference component to a q-axis current difference output from the second PI processor 32, thus generating the command value Vq_c for the q-axis voltage depending on the q-axis current difference.

The command value Vd_c for the d-axis voltage and the command value Vg_c for the q-axis voltage are supplied to the dq/3-phase converter 20. In this manner, the power drive unit 22 applies the three-phase voltages VU, VV, VW to the respective armatures of the motor 1 in order to eliminate the difference between the d-axis command current Id_c and the detected d-axis current Id_s (the d-axis current difference) and the difference between the q-axis command current Iq_c and the detected q-axis current Iq_s (the q-axis current difference), for thereby controlling the currents flowing through the armatures of the motor 1.

The first subtractor 28, the second subtractor 31, the first PI processor 29, the second PI processor 32, the dq/three-phase converter 20, and the power drive unit 22 jointly make up a current control means according to the present invention.

In order for the three-phase/dq converter 26 to calculate the detected d-axis current Id_s and the detected q-axis current Iq_s from the current value Iu_s detected by the U-phase current sensor 23, the current value Iw_s detected by the W-phase current sensor 24, and the rotor angle θ of the motor 1 according to the equations (3), (4) shown below, the motor controller 10 needs to detect the rotor angle θ.

$$id = \sqrt{2}\left\{Iu \cdot \sin\left(\theta + \frac{2}{3}\pi\right) - Iw \cdot \sin\theta\right\} \quad (3)$$

$$iq = \sqrt{2}\left\{Iu \cdot \cos\left(\theta + \frac{2}{3}\pi\right) - Iw \cdot \cos\theta\right\} \quad (4)$$

The motor controller 10 detects the rotor angle θ by adding the high-frequency voltages vu, vv, vw (expressed by the equation (5) shown below) output from the high-frequency adding unit 21 respectively to the command values VU_c, VV_c, VW_c for drive voltages applied respectively to the U, V, W phases, which command values VU_c, VV_c, VW_c are output from the dq/3-phase converter 20 without using a position detection sensor such as a resolver or the like.

$$\begin{bmatrix} vu \\ vv \\ vw \end{bmatrix} = \omega \begin{bmatrix} \sin\omega t \\ \sin\left(\omega t - \frac{2}{3}\pi\right) \\ \sin\left(\omega t - \frac{4}{3}\pi\right) \end{bmatrix} \quad (5)$$

Specifically, a third adder 34 adds the high-frequency voltage vu to the command value VU_c, a fourth adder 35 adds the high-frequency voltage vv to the command value VV_c, and a fifth adder 36 adds the high-frequency voltage vw to the command value VW_c. The angle detector 25 detects the rotor angle θ using the current value VV_s which is detected by the U-phase current sensor 23 and the current value Iw_s which is detected by the W-phase current sensor 23 when the high-frequency voltages vu, vv, vw are added. The angle detector 25 performs the functions of a reference value extracting means and a rotor angle calculating means according to the present invention.

The angle detector 25 puts the current value Iu_s detected by the U-phase current sensor 23 and the current value Iw_s detected by the W-phase current sensor 23 respectively into Iu, Iw in the equations (3), (4), puts an angular velocity ω of the high-frequency voltages vu, vv, vw in the equation (5) added by the high-frequency adding unit 21 into ω in the equations (3), (4), and calculates a sine reference value Vs and a cosine reference value Vc which are twice the rotor angle θ according to the following equations (6), (7):

$$Vs = \int_0^{\frac{\pi}{\omega}} \left\{\cos 2\omega t \cos\left(\omega t + \frac{2}{3}\pi\right) \cdot Iu - \cos 2\omega t \cos\omega t \cdot Iw\right\} dt \quad (6)$$

$$= -K\frac{3\sqrt{3}}{2}\Delta l \int_0^{\frac{2\pi}{\omega}} \cos 2\omega t \sin(2\omega t - 2\theta) dt +$$

$$\int_0^{\frac{2\pi}{\omega}} \left[\cos 2\omega t \cdot \cos\left(\omega t + \frac{2}{3}\pi\right) \cdot Iudc - \cos 2\omega t \cdot \cos\omega t \cdot Iwdc\right] dt$$

$$= -K\frac{3\sqrt{3}}{2}\Delta l \int_0^{\frac{2\pi}{\omega}} \left[\frac{\sin 4\omega t}{2}\cos 2\theta - \frac{1+\cos 4\omega t}{2}\sin 2\theta\right] dt +$$

$$\int_0^{\frac{2\pi}{\omega}} \left[\frac{\cos\left(3\omega t + \frac{2}{3}\pi\right) + \cos\left(\omega t - \frac{2}{3}\pi\right)}{2}\right] Iudc -$$

$$\frac{\cos 3\omega t + \cos\omega t}{2} Iwdc\Bigg] dt$$

$$= \frac{2\pi}{\omega} K \frac{3\sqrt{3}\Delta l}{4}\sin 2\theta$$

$$Vc = \int_0^{\frac{2\pi}{\omega}}\left\{\cos 2\omega t \cos\left(\omega t + \frac{2}{3}\pi\right) \cdot Iu - \sin 2\omega t \cos\omega t \cdot Iw\right\} dt \quad (7)$$

$$= K\frac{3\sqrt{3}}{2}\Delta l \int_0^{\frac{\pi}{\omega}} \sin 2\omega t \sin(2\omega t - 2\theta) dt +$$

$$\int_0^{\frac{2\pi}{\omega}} \left[\sin 2\omega t \cdot \cos\left(\omega t + \frac{2}{3}\pi\right) \cdot Iudc - \sin 2\omega t \cdot \cos 2\omega t \cdot Iwdc\right] dt$$

$$= K\frac{3\sqrt{3}}{2}\Delta l \int_0^{\frac{2\pi}{\omega}}\left[\frac{1-\cos 4\omega t}{2}\cos 2\theta - \frac{\sin 4\omega t}{2}\sin 2\theta\right] dt +$$

$$\int_0^{\frac{2\pi}{\omega}}\left[\frac{\sin\left(3\omega t + \frac{2}{3}\pi\right) + \sin\left(\omega t - \frac{2}{3}\pi\right)}{2}\right] Iudc -$$

$$\frac{\sin 3\omega t + \sin\omega t}{2} Iwdc\Bigg] dt$$

$$= \frac{2\pi}{\omega} K \frac{3\sqrt{3}\Delta l}{4}\cos 2\theta$$

where Iudc: a DC component of the current flowing through the U-phase armature, and Iwdc: a DC component of the current flowing through the W-phase armature.

Sine and cosine components with respect to wt in the equations (6), (7) correspond to the high-frequency components depending on the added high-frequency voltages according to the present invention. A calculation gain K in the equations (6), (7) is expressed by the following equation (8):

$$K = \frac{1}{2(l-m)\cdot l - \Delta l^2\left(\frac{3}{2} + 3\cos\frac{2}{3}\pi\right)} \quad (8)$$

where 1: a DC component of the self-inductance of each of the phases of the motor 1, Δ1: a change in the DC component 1, and m: a DC component of the mutual inductance between the phases of the motor 1.

In the equations (6), (7), an integration period is set to 0–2π/ω to equalize integrated values with respect to the DC components Iudc, Iwdc of the currents Iu, Iw to 0. However, if the currents Iu, Iw do not include DC components and are expressed by the equations (9), (10) shown below, then the sine reference value Vs and the cosine reference value Vc can be calculated even with an integration period being set to 0–λ/ω, according to the following equations (11), (12):

$$Iu = K\left[-(l-m)\cos\omega t - \frac{3\Delta l}{2}\cos(2\theta - \omega t)\right] \quad (9)$$

$$Iw = K\left[-(l-m)\cos\left(\omega t + \frac{2}{3}\pi\right) - \frac{3\Delta l}{2}\cos\left(2\theta - \omega t + \frac{2}{3}\pi\right)\right] \quad (10)$$

$$Vs = \int_0^{\frac{\pi}{\omega}} \left\{\cos2\omega t\cos\left(\omega t + \frac{2}{3}\pi\right) \cdot Iu - \cos2\omega t\cos\omega t \cdot Iw\right\}dt \quad (11)$$

$$= -K\frac{3\sqrt{3}\,\Delta l}{2}\int_0^{\frac{\pi}{\omega}}\cos2\omega t\sin(2\omega t - 2\theta)dt$$

$$= -K\frac{3\sqrt{3}\,\Delta l}{2}\int_0^{\frac{\pi}{\omega}}\cos2\omega t(\sin2\omega t\cos2\theta - \cos2\omega t\sin2\theta)dt$$

$$= -K\frac{3\sqrt{3}\,\Delta l}{2}\int_0^{\frac{\pi}{\omega}}\left[\frac{\sin4\omega t}{2}\cos2\theta - \frac{1+\cos4\omega t}{2}\sin2\theta\right]dt$$

$$= K\frac{3\sqrt{3}\,\Delta l}{4}\sin2\theta$$

$$Vc = \int_0^{\frac{\pi}{\omega}}\left\{\sin2\omega t\cos\left(\omega t + \frac{2}{3}\pi\right) \cdot Iu - \sin2\omega t\cos\omega t \cdot Iw\right\}dt \quad (12)$$

$$= K\frac{3\sqrt{3}\,\Delta l}{2}\int_0^{\frac{\pi}{\omega}}\sin2\omega t\sin(2\omega t - 2\theta)dt$$

$$= K\frac{3\sqrt{3}\,\Delta l}{2}\int_0^{\frac{\pi}{\omega}}\sin2\omega t(\sin2\omega t\cos2\theta - \cos2\omega t\sin2\theta)dt$$

$$= K\frac{3\sqrt{3}\,\Delta l}{2}\int_0^{\frac{\pi}{\omega}}\left[\frac{1-\cos4\omega t}{2}\cos2\theta - \frac{\sin4\omega t}{2}\sin2\theta\right]dt$$

$$= K\frac{3\sqrt{3}\,\Delta l}{4}\cos2\theta$$

The rotor angle θ of the motor 1 can be calculated according to the following equation (13) based on the equations (6), (7) or the equations (11), (12):

$$\theta = \frac{1}{2}\tan^{-1}\frac{Vs}{Vc} \quad (13)$$

The $\tan^{-1}$ function changes largely as the sine reference value Vs and the cosine reference value Vc change. Therefore, when the rotor angle θ of the motor 1 is calculated according to the equation (13), an error in detecting the rotor angle θ may possibly become large due to an error caused in calculating the sine reference value Vs and the cosine reference value Vc.

To avoid the above error, the angle detector 25 calculates a rotor angle of the motor 1 according to the above equation (15) at a first sampling time, and then at next and subsequent sampling times, calculates, based on the equation (14) shown below, Δθ expressed by the equation (15) shown below as phase difference data depending on the phase difference (θ–θ–) between an estimated value 0 of the rotor angle and an actual value 0 of the rotor angle, and calculates a rotor angle according to a follow-up calculation process effected by an observer represented by the equation (16) shown below which is constructed to eliminate the phase difference (θ–θ–).

In this case, changes in the gain due to changes in the magnitude ($\sqrt{Vs^2+Vc^2}$) of the high-frequency components can be suppressed for increased stability in calculating the rotor angle.

$$Vs\cdot\cos2\hat\theta - Vc\cdot\sin2\hat\theta = \sqrt{Vs^2+Vc^2}\sin(2\theta - 2\hat\theta) \quad (14)$$

$$\approx \sqrt{Vs^2+Vc^2}\cdot 2(\theta - \hat\theta)\ (\text{if}\ (\theta - \hat\theta) \approx 0)$$

$$\Delta\theta = 2(\theta - \hat\theta) \approx \sin(2\theta - 2\hat\theta) \quad (15)$$

$$= \frac{Vs\cdot\cos2\hat\theta - Vc\cdot\sin2\hat\theta}{\sqrt{Vs^2+Vc^2}}$$

$$\begin{bmatrix}\hat\theta(n+1)\\ \hat\omega(n+1)\end{bmatrix} = \begin{bmatrix}1 & \Delta t\\ 0 & 1\end{bmatrix}\begin{bmatrix}\hat\theta(n)\\ \hat\omega(n)\end{bmatrix} + \begin{bmatrix}K1\\ K2\end{bmatrix}\frac{2(\theta(n) - \hat\theta(n))}{\sqrt{Vs^2+Vc^2}} \quad (16)$$

where θ(n), θ–(n), ω–(n) represent actual and estimated values of the rotor angle θ and an estimated value of the angular velocity θ of the rotor 2, respectively, at a certain sampling time n, θ–(n+1), ω–(n+1) represent an estimated value of the rotor angle θand an estimated value of the angular velocity ωof the rotor 2, respectively, at a next sampling time n+1, Δt represents a sampling period, and K1, K2 represent calculation gains.

If the angle detector 25 has its calculation ability so poor that it poses a problem on the time required to calculate the square root in the equation (15), then the equation (15) may be approximated by the following equation (17):

$$\Delta\theta = 2(\theta - \hat\theta) \approx \sin(2\theta - 2\hat\theta) \quad (17)$$

$$= \begin{cases}\dfrac{Vs\cdot\cos2\hat\theta - Vc\cdot\sin2\hat\theta}{|Vs|} & (|Vs| > |Vc|)\\[6pt] \dfrac{Vs\cdot\cos2\hat\theta - Vc\cdot\sin2\hat\theta}{|Vc|} & (|Vc| > |Vs|)\end{cases}$$

In the present embodiment, the angle detector 25 integrates the high-frequency components that change with time according to the equations (6). (7), thereby calculating the sine reference value Vs and the cosine reference value Vc which are twice the rotor angle θ. Alternatively, the angle detector 25 may output the sine reference value Vs and the cosine reference value Vc through a low-pass filter.

The motor 1 comprises a salient-pole DC brushless motor and the inductance in the gap of the rotor 2 changes at a period which is ½ of the rotor angle, the rotor angle can be calculated in an electrical angle range from 0 to 180° or from 180° to 360°. In order to detect a rotor angle in a range from 0° to 360°, it is necessary to detect the orientation of the magnetic poles of the rotor 2.

A current (Iq) is passed through the q-axis armature to generate a magnetic field in the direction of the q-axis, i.e., in the direction of the magnetic flux of the magnet of the rotor 2. As shown in FIG. 3, in a saturated state in which the direction of the magnetic field (Bs) generated by the current (Iq) and the direction of a magnetic field (Bm) generated by the rotor magnet are the same as each other, Δ1 (a change in the DC component 1 of the self-inductance of each of the phases U, V, W) is large, resulting in a large flux density of the total magnetic field (Bt).

In an unsaturated state in which the direction of the magnetic field (Bs) generated by the current (Iq) and the direction of the magnetic field (Bm) generated by the rotor magnet are different from each other, the change Δ1 is small, resulting in a small flux density of the total magnetic field (Bt).

Therefore, a magnetic pole reference value A calculated from the sine reference value Vs and the cosine reference value Vc (calculated according to the equations (6), (7)), which vary depending on the value of Δ1, according to the following equation (18) (corresponding to a predetermined calculating process according to the present invention) when the rotor 2 is in the saturated state differs from a magnetic pole reference value A calculated in the same manner when the rotor 2 is in the unsaturated state.

$$A = \sqrt{Vs^2 + Vc^2} \quad (18)$$

The angle detector 25 calculates a sine reference value Vs and a cosine reference value Vc according to the above equations (6), (7) from the detected current values which are produced by the W-phase current sensor 24 and the U-phase current sensor 23 while the high-frequency voltages vu, vv, vw are being added by the high-frequency adder 21 and a first magnetic pole detecting current is being passed through the q-axis armature. The angle detector 25 uses a magnetic pole reference value A calculated from the sine reference value Vs and the cosine reference value Vc according to the equation (18), as a first magnetic pole reference value $A_1$.

Similarly, the angle detector 25 calculates a sine reference value Vs and a cosine reference value Vc according to the above equations (6), (7) from the detected current values which are produced by the W-phase current sensor 24 and the U-phase current sensor 23 while the high-frequency voltages vu, vv, vw are being added by the high-frequency adder 21 and a second magnetic pole detecting current, which is opposite in direction to the first magnetic pole detecting current, is being passed through the q-axis armature. The angle detector 25 uses a magnetic pole reference value A calculated from the sine reference value Vs and the cosine reference value Vc according to the equation (18), as a second magnetic pole reference value $A_2$.

Figure 4:
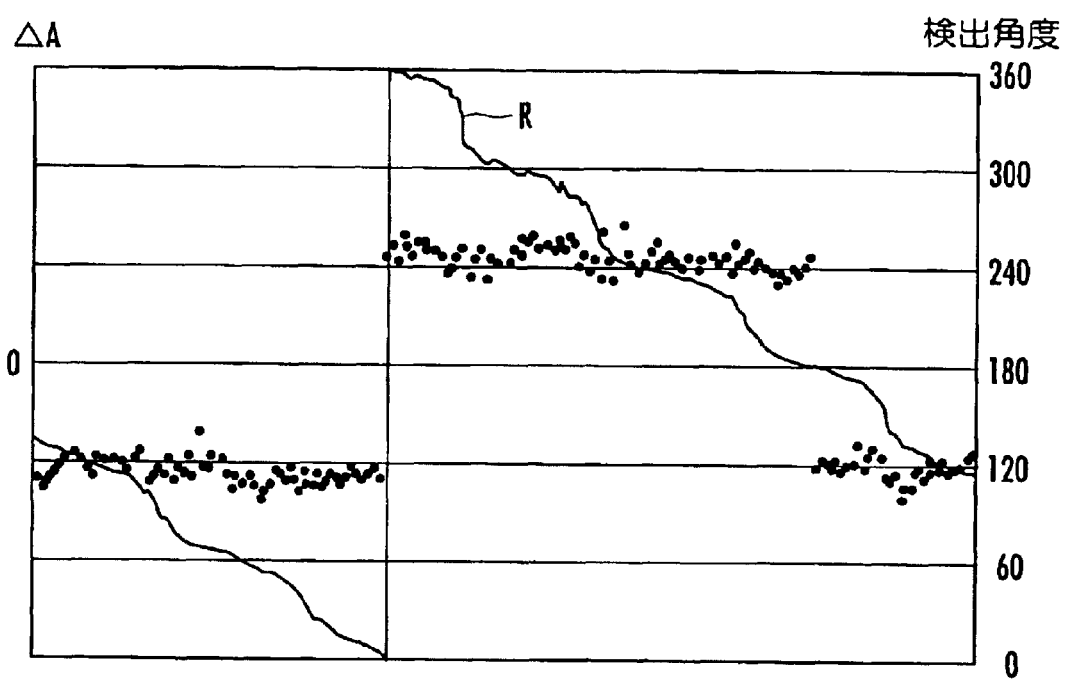

The difference $\Delta A$ ($\Delta A = A_1 - A_2$) between the first magnetic pole reference value $A_1$ and the second magnetic pole reference value $A_2$ changes as shown in FIG. 4.

FIG. 4 represents a graph of values of the difference $\Delta A$ calculated at different rotor angles of the motor 1 and detected values R of the rotor angle which are plotted over the values of the difference $\Delta A$. In FIG. 4, the difference $\Delta A$ has its sign inverted when the rotor angle is 360° and 180°. Therefore, the angle detector 25 can detect the orientation of the magnetic poles of the rotor 2 based on the sign of the difference $\Delta A$.

Figure 5:
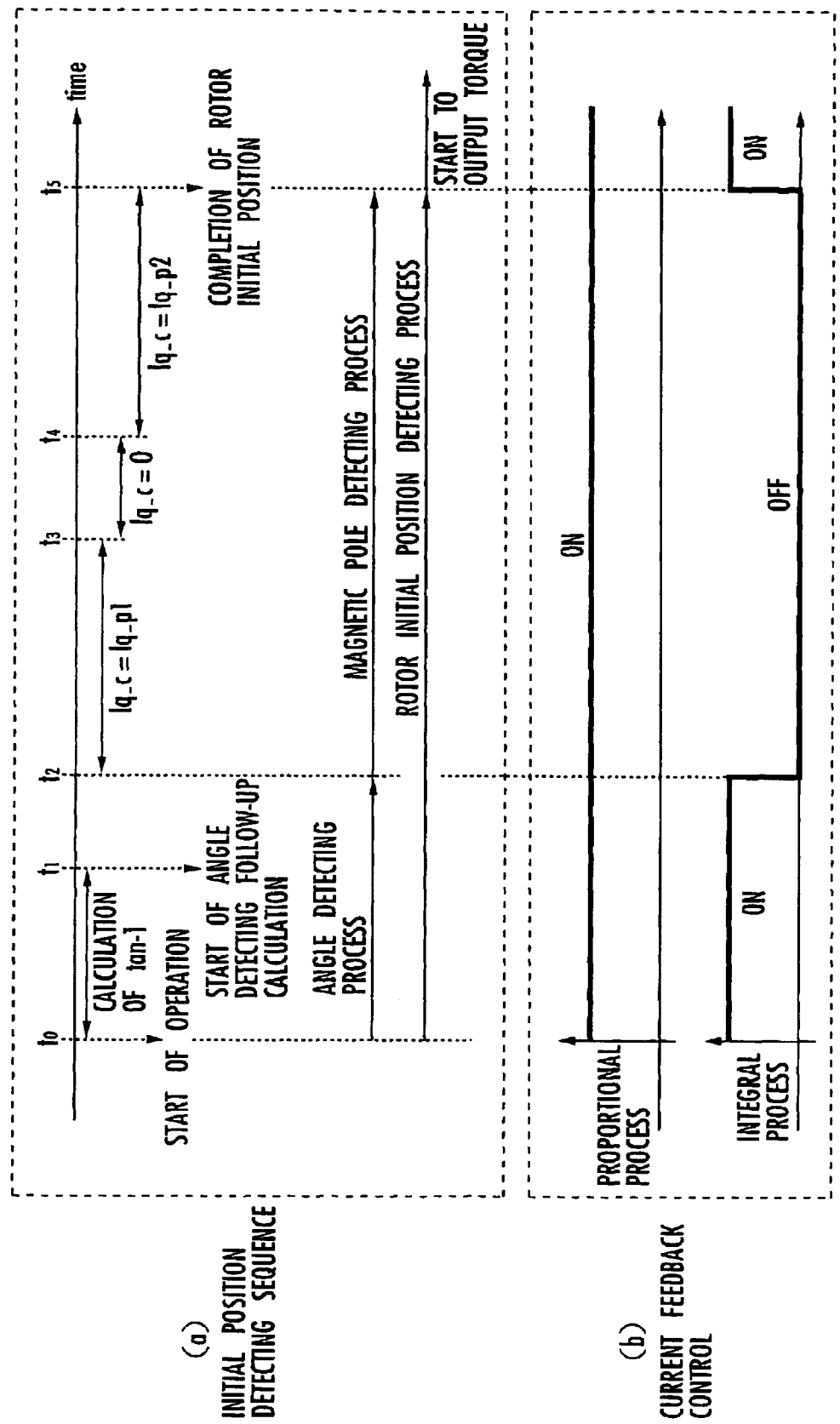
FIGS. 5(a) and 5(b) are diagrams showing a procedure for detecting an initial position of a rotor.

FIGS. 5(a) and 5(b) show a procedure expressed as a time sequence for detecting the rotor angle of the rotor 1 and the orientation of the magnetic poles of the rotor 2. Specific details of the procedure for detecting the rotor angle of the rotor 1 and the orientation of the magnetic poles of the rotor 2 with the angle detector 25 will be described below with reference to FIGS. 5(a) and 5(b).

When the motor 1 is instructed to start operating at time $t_0$ in FIG. 5(a), the high-frequency adder 21 starts adding the high-frequency voltages vu, vv, vw. At a first sampling time, the angle detector 25 detects a rotor angle of the motor 1 according to the above equation (13) ($t_0 - t_1$). At next and subsequent sampling times, the angle detector 25 detects a rotor angle according to the follow-up calculation process effected by the observer represented by the equation (16).

Then, the angle detector 25 carries out a process of detecting the magnetic poles of the rotor 2 of the motor 1 (($t_2 - t_5$). In the process of detecting the magnetic poles, the angle detector 25 sets the q-axis command current Iq_c to a first magnetic pole detecting current Iq_p1 (Iq_c=Iq_p1), and calculates a first magnetic pole reference value $A_1$ according to the equation (18) ($t_2 - t_3$). Then, the angle detector 25 sets the q-axis command current Iq_c to a second magnetic pole detecting current Iq_p2 (Iq_c=Iq_p2), and calculates a second magnetic pole reference value $A_2$ according to the equation (18) ($t_4 - t_5$).

The angle detector 25 detects the orientation of the magnetic poles of the rotor 2 from the sign of the difference $\Delta A$ ($\Delta A = A_1 - A_2$) between the first magnetic pole reference value $A_1$ and the second magnetic pole reference value $A_2$. The detection of an initial position of the rotor 2 is now completed. The orientation of the magnetic poles of the rotor 2 may be detected once at the time of starting operation of the motor 1. Subsequently, the rotor angle can be detected in the range from 0 to 360 degrees from the transition of the rotor angle.

If the time required to detect the magnetic poles of the rotor 2 is long, then the time spent before the torque control for the motor 1 is long. As shown in FIG. 5(b), in the process of detecting the magnetic poles, the angle detector 25 inhibit the integrating process in the first PI processor 29 and the second PI processor 32, but allow them to the proportional process only.

Figure 6:
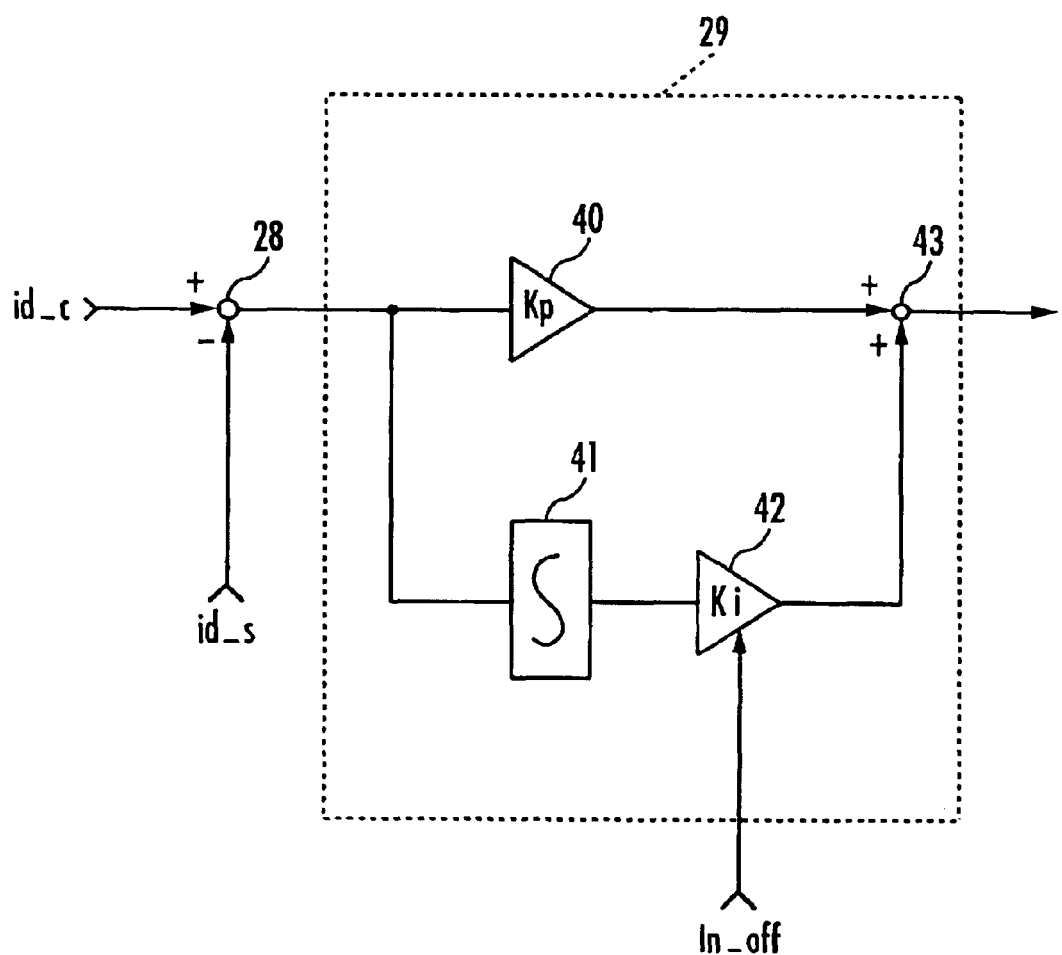
FIG. 6 is a diagram of a PI (Proportional plus Integral) processor of the motor controller shown in FIG. 2.

Specifically, as shown in FIG. 6, the first PI processor 29 comprises a multiplier 40 having a proportionality coefficient Kp, an integrator 41, a multiplier 42 having an integration coefficient Ki, and an adder 43. The angle detector 25 applies a parameter In_off which indicates an inhibition of the integrating process to the first PI processor 29 to make the integration coefficient Ki nil, allowing the first PI processor 29 to carry out the proportional process only.

The second PI processor 32 is identical in structure ot the first PI processor 29. The angle detector 25 also applies the parameter In_off to the second PI processor 32 to make the integration coefficient Ki nil, allowing the second PI processor 32 to carry out the proportional process only.

Rather than making the integration coefficient Ki nil, the integrators 41 of the first PI processor 29 and the second PI processor 32 may be inhibited from accumulating data to make the accumulated value nil, so that the first PI processor 29 and the second PI processor 32 may be inhibited from carrying out the integrating process, but may be allowed to carry out the proportional process only.

The integrating process carried out by the first PI processor 29 and the second PI processor 32 serves to suppress variations in the currents flowing through the armatures of the motor 1 for ther by increasing the stability of current control during rotation of the motor 1. If the integrating process is carried out by the first PI processor 29 and the second PI processor 32 while the process of detecting the magnetic poles is being performed, then the integrating process acts to suppress an increase in the q-axis current difference when the q-axis command current Iq_c is set to the first magnetic pole detecting current Iq_p1 and the second magnetic pole detecting current Iq_p2.

Therefore, a delay time after the q-axis command current Iq_c is set to the first magnetic pole detecting current Iq_p1 and the second magnetic pole detecting current Iq_p2 until the first magnetic pole detecting current Iq_p1 and the second magnetic pole detecting current Iq_p2 actually flow through the armatures of the motor 1 is increased, resulting in an increased time required to detect the magnetic poles of the rotor 2.

To avoid the above drawback, when the process of detecting the magnetic poles is carried out, the first PI processor 29 and the second PI processor 32 are inhibited from carrying out the integrating process, thus reducing the delay time after the q-axis command current Iq_c is set to the first magnetic pole detecting current Iq_p1 and the second magnetic pole detecting current Iq_p2 until the first magnetic pole detecting current Iq_p1 and the second magnetic pole detecting current Iq_p2 actually flow through the armatures of the motor 1.

Consequently, the time ($t_2 - t_5$) required to carry out the process of detecting the magnetic poles to detect the orientation of the magnetic poles of the rotor 2 based on the sign of the difference ΔA between the first magnetic pole reference value $A_1$ depending on the first magnetic pole detecting current Iq_p1 and the second magnetic pole reference value $A_2$ depending on the second magnetic pole detecting current Iq_p2 is shortened. Therefore, the time ($t_0-t_5$) required after the motor 1 is instructed to start operating until the motor starts outputting its torque is reduced.

According to another process of detecting the orientation of the magnetic poles of the rotor 2, a magnetic pole detecting current in one direction is passed through the q-axis armature, and the magnetic pole reference value A calculated at this time according to the equation (18) is compared with a predetermined threshold to detect the orientation of the magnetic poles of the rotor 2. In this process, the first PI processor 29 and the second PI processor 32 may be inhibited from carrying out the integrating process, but allowed to carry out the proportional process only, thus reducing the time required to detect the orientation of the magnetic poles of the rotor 2 and hence to reduce the time required until the motors 1 starts outputting its torque.

Although a certain preferred embodiment of the present invention has been shown and described in detail, it should be understood that various changes and modifications may be made therein without departing from the scope of the appended claims.

What is claimed is:

1. An apparatus for controlling a salient-pole DC brushless motor having armatures in three phases, comprising:

voltage applying means for applying drive voltages to said armatures;

high-frequency adding means for adding high-frequency voltages to said drive voltages;

first current detecting means for detecting a current flowing through an armature in a first phase of said armatures in the three phases;

second current detecting means for detecting a current flowing through an armature in a second phase of said armatures in the three phases;

reference value extracting means for extracting a sine reference value depending on the sine value of a twofold angle which is twice a rotor angle of said motor and a cosine reference value depending on the cosine value of the twofold angle, using a first current value detected by said first current detecting means and a second current value detected by said second current detecting means when said high-frequency voltages are added to said drive voltages by said high-frequency adding means, and high-frequency components depending on said high-frequency voltages;

rotor angle calculating means for calculating a rotor angle of said motor using said sine reference value and said cosine reference value;

three-phase/dq converting means for handling said motor as an equivalent circuit having a q-axis armature disposed on a q-axis in the direction of magnetic fluxes from a rotor of the motor and a d-axis armature disposed on a d-axis which is perpendicular to the q-axis, and calculating a detected q-axis current flowing through said q-axis armature and a detected d-axis current flowing through said d-axis armature based on the rotor angle of said motor which is calculated by said rotor angle calculating means, said first current value, and said second current value;

current control means for determining said drive voltages in order to eliminate a q-axis current difference which is the difference between the detected q-axis current and a predetermined q-axis command current and a d-axis current difference which is the difference between the detected d-axis current and a predetermined d-axis command current; and magnetic pole detecting means for carrying out a magnetic pole detecting process to detect the orientation of the magnetic poles of said rotor based on a magnetic pole reference value calculated by a predetermined calculating process, depending on said sine reference value and said cosine reference value which are extracted by said reference value extracting means when said q-axis command value current is set to a predetermined magnetic pole detecting current;

said current control means comprising means for performing a proportional plus integral process on the difference between said detected q-axis current and said q-axis command current to calculate said q-axis current difference and also performing a proportional plus integral process on the difference between said detected d-axis current and said d-axis command current to calculate said d-axis current difference when said magnetic pole detecting process is not carried out, and performing an integral process only on the difference between said detected q-axis current and said q-axis command current to calculate said q-axis current difference and also performing an integral process only on the difference between said detected d-axis current and said d-axis command current to calculate said d-axis current difference when said magnetic pole detecting process is carried out.

2. An apparatus according to claim 1, wherein said magnetic pole detecting means comprises means for setting a first magnetic pole detecting current and a second magnetic pole detecting current which is opposite in direction to said first magnetic pole detecting current as said magnetic pole detecting current, and detecting the orientation of the magnetic poles of said rotor based on the difference between a first magnetic pole reference value calculated by said predetermined calculating process depending on said sine reference value and said cosine reference value which are extracted by said reference value extracting means when said first magnetic pole detecting current is set, and a second magnetic pole reference value calculated by said predetermined calculating process depending on said sine reference value and said cosine reference value which are extracted by said reference value extracting means when said second magnetic pole detecting current is set.

3. An apparatus according to claim 1, wherein said reference value extracting means comprises means for extracting said sine reference value and said cosine reference value respectively according to the following equations (19), (20):

$$Vs = \int_0^{\frac{2\pi}{\omega}} \left\{ \cos 2\omega t \cos\left(\omega t + \frac{2}{3}\pi\right) \cdot Iu - \cos 2\omega t \cos \omega t \cdot Iw \right\} dt \quad (19)$$

$$Vc = -\int_0^{\frac{2\pi}{\omega}} \left\{ \sin 2\omega t \cos\left(\omega t + \frac{2}{3}\pi\right) \cdot Iu - \sin 2\omega t \cos \omega t \cdot Iw \right\} dt \quad (20)$$

where Vs: the sine reference value, Vc: the cosine reference value, Iu: the first current value, Iw: the second current value, and ω: the angular velocity of said high-frequency voltages.

4. A method for controlling a salient-pole DC brushless motor having armatures in three phases, wherein an apparatus for controlling said DC brushless motor comprises:

voltage applying means for applying drive voltages to said armatures;

high-frequency adding means for adding high-frequency voltages to said drive voltages;

first current detecting means for detecting a current flowing through an armature in a first phase of said armatures in the three phases;

second current detecting means for detecting a current flowing through an armature in a second phase of said armatures in the three phases;

reference value extracting means for extracting a sine reference value depending on the sine value of a twofold angle which is twice a rotor angle of said motor and a cosine reference value depending on the cosine value of the twofold angle, using a first current value detected by said first current detecting means and a second current value detected by said second current detecting means when said high-frequency voltages are added to said drive voltages by said high-frequency adding means, and high-frequency components depending on said high-frequency voltages;

rotor angle calculating means for calculating a rotor angle of said motor using said sine reference value and said cosine reference value; and three-phase/dg converting means for handling said motor as an equivalent circuit having a q-axis armature disposed on a q-axis in the direction of magnetic fluxes from a rotor of the motor and a d-axis armature disposed on a d-axis which is perpendicular to the q-axis, and calculating a detected q-axis current flowing through said q-axis armature and a detected d-axis current flowing through said d-axis armature based on the rotor angle of said motor which is calculated by said rotor angle calculating means, said first current value, and said second current value;

wherein said method comprises the step of:

determining said drive voltages in order to eliminate a q-axis current difference which is the difference between the detected q-axis current and a predetermined q-axis command current and a d-axis current difference which is the difference between the detected d-axis current and a predetermined d-axis command current;

performing a magnetic pole determination process for detecting the orientation of the magnetic poles of said rotor based on a magnetic pole reference value calculated by a predetermined calculating process, depending on said sine reference value and said cosine reference value which are extracted by said reference value extracting means when said q-axis command current is set to a predetermined magnetic pole detecting current; and performing a proportional plus integral process on the difference between said detected q-axis current and said q-axis command current to calculate said q-axis current difference and also performing a proportional plus integral process on the difference between said detected d-axis current and said d-axis command current to calculate said d-axis current difference when said magnetic pole detecting process is not performed, and performing an integral process only on the difference between said detected q-axis current and said q-axis command current to calculate said q-axis current difference and also performing an integral process only on the difference between said detected d-axis current and said d-axis command current to calculate said d-axis current difference when said magnetic pole detecting process is performed.

5. A method according to claim 4, further comprising the step of setting a first magnetic pole detecting current and a second magnetic pole detecting current, which is opposite in direction to said first magnetic pole detecting current as said magnetic pole detecting current, said step of performing the magnetic pole determination process comprising the step of:

detecting the orientation of the magnetic poles of said rotor based on the difference between a first magnetic pole reference value calculated by said predetermined calculating process depending on said sine reference value and said cosine reference value which are extracted by said reference value extracting means when said first magnetic pole detecting current is set, and a second magnetic pole reference value calculated by said predetermined calculating process depending on said sine reference value and said cosine reference value which are extracted by said reference value extracting means when said second magnetic pole detecting current is set.

6. A method according to claim 4 wherein said reference value extracting means comprises means for extracting said sine reference value and said cosine reference value respectively according to the following equations (21), (22):

$$Vs = \int_0^{\frac{2\pi}{\omega}} \left\{ \cos2\omega t \cos\left(\omega t + \frac{2}{3}\pi\right) \cdot Iu - \cos2\omega t \cos\omega t \cdot Iw \right\} dt \quad (21)$$

$$Vc = -\int_0^{\frac{2\pi}{\omega}} \left\{ \sin2\omega t \cos\left(\omega t + \frac{2}{3}\pi\right) \cdot Iu - \sin2\omega t \cos\omega t \cdot Iw \right\} dt \quad (22)$$

where VS: the sine reference value, Vc: the cosine reference value, Iu: the first current value, Iw: the second current value, and ω: the angular velocity of said high-frequency voltages.

* * * * *